United States Patent
Hanner

(10) Patent No.: US 7,191,468 B2
(45) Date of Patent: Mar. 13, 2007

(54) SYSTEM AND METHOD FOR MULTIDIMENSIONAL DATA COMPRESSION

(75) Inventor: Brian D. Hanner, Campbell, CA (US)

(73) Assignee: The Boeing Company, Seattle, WA (US)

( * ) Notice: Subject to any disclaimer, the term of this patent is extended or adjusted under 35 U.S.C. 154(b) by 855 days.

(21) Appl. No.: 10/196,488

(22) Filed: Jul. 15, 2002

(65) Prior Publication Data
US 2003/0033435 A1 Feb. 13, 2003

Related U.S. Application Data

(60) Provisional application No. 60/306,193, filed on Jul. 17, 2001, provisional application No. 60/306,188, filed on Jul. 17, 2001, provisional application No. 60/306,155, filed on Jul. 17, 2001.

(51) Int. Cl.
*H04L 9/00* (2006.01)
(52) U.S. Cl. .................. 726/13; 713/177; 713/160
(58) Field of Classification Search ................. 726/13; 713/177
See application file for complete search history.

(56) References Cited

U.S. PATENT DOCUMENTS

| | | | |
|---|---|---|---|
| 5,708,659 A * | 1/1998 | Rostoker et al. | 370/392 |
| 6,092,191 A * | 7/2000 | Shimbo et al. | 713/153 |
| 6,359,886 B1 * | 3/2002 | Ujihara et al. | 370/392 |
| 6,657,562 B2 * | 12/2003 | Radermacher et al. | 341/50 |
| 6,704,866 B1 * | 3/2004 | Benayoun et al. | 713/151 |
| 2002/0181463 A1 * | 12/2002 | Knight | 370/392 |

* cited by examiner

*Primary Examiner*—Matthew Smithers
(74) *Attorney, Agent, or Firm*—Alston & Bird LLP

(57) ABSTRACT

A computer-based method and system for performing header filtering of data is presented The method comprises compressing the header of a data packet to obtain a header signature and determining if the header signature matches a known header signature. If the header signature is determined to have a match, then the header signature is identified as a known header signature. A header signature may be generated using a multidimensional data compression algorithm. A compression algorithm comprises obtaining the data bits contained in each field of a typical header. Then, a header-field group that corresponds uniquely to each field is determined. Each field is replaced with the header-field group of the corresponding data bits of the field and concatenated to create a header signature.

22 Claims, 3 Drawing Sheets

| | | | |
|---|---|---|---|
| 000000: OUTCOME1/1 | 010000: OUTCOME4/6 | 100000: OUTCOME2/5 | 110000: OUTCOME4/6 |
| 000001: OUTCOME4/6 | 010001: OUTCOME4/6 | 100001: OUTCOME2/5 | 110001: OUTCOME4/6 |
| 000010: OUTCOME4/6 | 010010: OUTCOME1/4 | 100010: OUTCOME2/5 | 110010: OUTCOME4/6 |
| 000011: OUTCOME3/3 | 010011: OUTCOME3/3 | 100011: OUTCOME2/5 | 110011: OUTCOME3/3 |
| 000100: OUTCOME2/5 | 010100: OUTCOME2/5 | 100100: OUTCOME2/5 | 110100: OUTCOME2/5 |
| 000101: OUTCOME4/6 | 010101: OUTCOME4/6 | 100101: OUTCOME2/5 | 110101: OUTCOME4/6 |
| 000110: OUTCOME4/6 | 010110: OUTCOME4/6 | 100110: OUTCOME2/5 | 110110: OUTCOME4/6 |
| 000111: OUTCOME4/6 | 010111: OUTCOME4/6 | 100111: OUTCOME2/5 | 110111: OUTCOME4/6 |
| 001000: OUTCOME4/6 | 011000: OUTCOME4/6 | 101000: OUTCOME4/6 | 111000: OUTCOME4/6 |
| 001001: OUTCOME2/2 | 011001: OUTCOME4/6 | 101001: OUTCOME4/6 | 111001: OUTCOME4/6 |
| 001010: OUTCOME2/2 | 011010: OUTCOME1/4 | 101010: OUTCOME4/6 | 111010: OUTCOME4/6 |
| 001011: OUTCOME3/3 | 011011: OUTCOME3/3 | 101011: OUTCOME3/3 | 111011: OUTCOME3/3 |
| 001100: OUTCOME2/5 | 011100: OUTCOME2/5 | 101100: OUTCOME2/5 | 111100: OUTCOME2/5 |
| 001101: OUTCOME4/6 | 011101: OUTCOME4/6 | 101101: OUTCOME4/6 | 111101: OUTCOME4/6 |
| 001110: OUTCOME4/6 | 011110: OUTCOME4/6 | 101110: OUTCOME4/6 | 111110: OUTCOME4/6 |
| 001111: OUTCOME4/6 | 011111: OUTCOME4/6 | 101111: OUTCOME4/6 | 111111: OUTCOME4/6 |

FIG. 3

SYSTEM AND METHOD FOR MULTIDIMENSIONAL DATA COMPRESSION

CROSS-REFERENCE TO RELATED APPLICATIONS

This application claims priority from commonly owned U.S. Provisional Patent Applications 60/306,155, titled SYSTEM AND METHOD FOR MULTIDIMENSIONAL DATA COMPRESSION, 60/306,188, titled SYSTEM AND METHOD FOR VIRTUAL PACKET REASSEMBLY and 60/306,193, titled SYSTEM AND METHOD FOR STRING FILTERING all of which were filed on Jul. 17, 2001 and are presently pending, and are hereby incorporated by reference in their entirety.

CROSS-RELATED APPLICATIONS

This application is related to utility patent applications U.S. application Ser. No. 10/196,509 titled SYSTEM AND METHOD FOR STRING FILTERING and U.S. application Ser. No. 10/196,512 titled SYSTEM AND METHOD FOR VIRTUAL PACKET REASSEMBLY, which were filed on the same day as this application and which are hereby incorporated by reference in their entirety.

TECHNICAL FIELD OF THE INVENTION

The present invention relates generally to signal processing systems and methods in which multiple types of data are processed to arrive at an outcome. The present invention may comprise a system and method for generating compressed representations of data packets, and for processing such compressed data packet representations to perform packet and/or header filtering operations.

BACKGROUND OF THE INVENTION

Multidimensional data comprises multiple types of information upon which particular processing sequences may be performed to arrive at a given outcome. Portions of such processing sequences may be dependent upon the characteristics of constituent information within the multidimensional data itself. Examples of multidimensional data include vectors, informational databases, and mathematic matrices.

One type of multidimensional data is a networking datagram or packet. A packet comprises a self-contained messaging unit having fields specified or defined in accordance with one or more network transport protocols, for example, Transmission Control Protocol in conjunction with the Internet Protocol (TCP/IP). Particular fields may be reserved for source and/or destination routing information, while other fields may be reserved for data content. The routing information is sufficient to enable elements within a transporting network to deliver the packet to a target destination.

Packets flowing upon a computer network, and/or flowing from one computer network to another, may contain information directed toward compromising network security and/or performing malicious or destructive operations upon one or more computer systems. Such packets are typically associated with an attempted hacker intrusion.

An Intrusion Detection System (IDS) comprises software that performs packet filtering operations. During packet filtering operations, the IDS examines packets flowing upon a computer network, and determines whether any given packet exhibits characteristics associated with known types of network intrusions and/or hacker attacks. The packet filtering operations may include header filtering operations directed toward examining packet headers; and string filtering operations directed toward examining packet data content.

In header filtering operations, an IDS compares various field values within a protocol header with values associated with known hacker attacks, commonly referred to as attack signatures. Unfortunately, hacker attacks may span multiple fields, where field values may be combined as Boolean expressions, thereby complicating header filtering operations. Furthermore, hundreds of known hacker attacks exist, and thus an IDS may need to examine thousands of field value combinations to accurately determine whether a given packet or packet sequence corresponds to an attack signature.

Traditional packet filtering systems and methods typically rely upon tree search algorithms, in which a result of a given field value test narrows a number of possible attack signatures for subsequent consideration. However, such tree search algorithms are performed serially, and are therefore significantly slower than desired. Moreover, their performance degrades as additional attack signatures are discovered.

An additional problem arises because modern networks continue to evolve toward ever-higher data transfer rates. For example, high speed Local Area Networks (LANs) may operate at 1000 Megabits per second (Mbits/sec). Similarly, internet access points commonly operate at 155 Mbits/sec and 622 Mbits/sec; higher operating speeds are likely in the future. Present day systems and methods for packet filtering and/or network intrusion detection are capable of examining only a fraction of the packets traversing such networks, thereby significantly limiting their usefulness. There exists no present day IDS capable of providing adequate packet filtering in high-speed network environments exists.

SUMMARY OF THE INVENTION

An embodiment of the present invention is directed to a computer-based method and system for performing header filtering of data. The method comprises compressing the header of a data packet to obtain a header signature and determining if the header signature matches a known header signature. If the header signature is determined to have a match, then the header signature is identified as a known header signature. A header signature may be generated using a multidimensional data compression algorithm.

In another embodiment of the invention, a compression algorithm comprises obtaining the data bits contained in each field of a typical header. Then, a header-field group that corresponds uniquely to each field is determined. Each field is replaced with the header-field group of the corresponding data bits of the field and concatenated to create a header signature.

In contrast to prior systems and methods, the multidimensional data compression provided by the above-described embodiments of the invention eliminates the need to rely upon slow and/or inefficient tree search algorithms. Additionally, these embodiments may be characterized by the generation of a header signature via a constant or essentially constant number of operations. As a number of known signatures associated with hacker attacks increases, the sizes of one or more header-field groups may increase, yet the number of operations required to perform header or packet filtering may remain unchanged. Furthermore, these embodiments may be implemented using hardware. As a

BRIEF DESCRIPTION OF THE DRAWINGS

FIG. 3 is a lookup table addressed in accordance with signature values and storing associated processing outcomes corresponding to a compression of exemplary multidimensional size and color data in accordance with an embodiment of the invention.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Embodiments of the present invention may be applied in the context of header filtering for the purpose of network-intrusion detection. But the following description is not intended to limit the use of the invention in other applications that use header filtering, such as word processors, signal processors, and/or database management tools.

Figure 1:
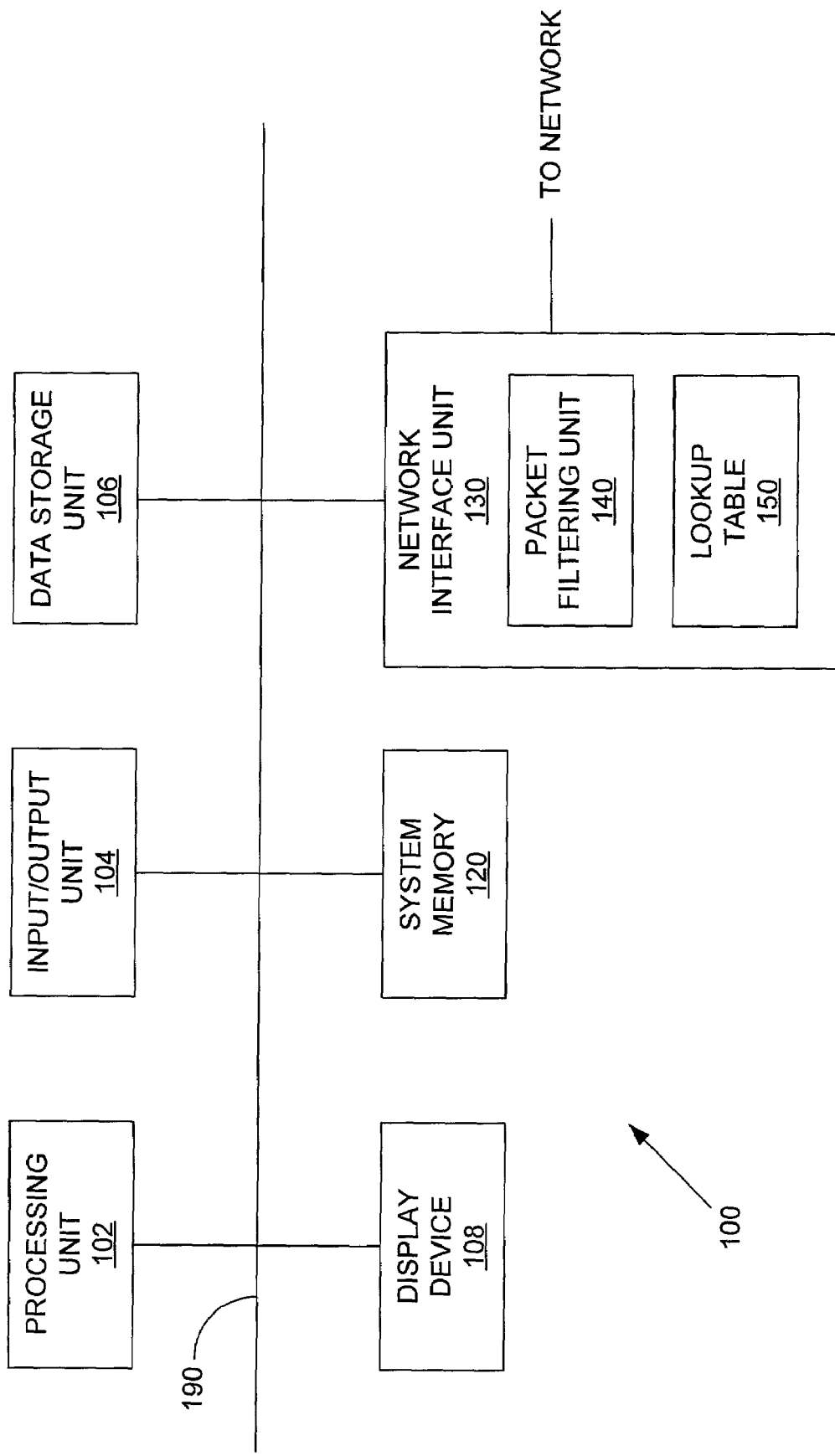
FIG. 1 is a block diagram of a system incorporating hardware and/or software elements for implementing or performing header filtering operations in accordance with an embodiment of the invention.

FIG. 1 is a block diagram of a system 100 for header filtering constructed in accordance with an embodiment of the invention. The system 100 may be part of an overall Intrusion Detection System (IDS). The system 100 may comprise a processing unit 102, an input/output unit 104, a data storage unit 106, a display device 108, a system memory 120, and a network-interface unit 130, each of which may be coupled to a common bus 190.

The network-interface unit 130 may interface the system 100 to a computer network upon which packet-filtering operations are required. The network-interface unit 130 may comprise conventional network communication or interface elements, as well as a packet-filtering unit 140 and an associated lookup table 150 constructed and/or operating in accordance with an embodiment of the invention. The lookup table 150 may reside in a local memory (not shown) on the network-interface unit 130 or in the system memory 120. The network interface unit 130 may serve as an interface between the system 100 and a network upon which packet-filtering operations are required. The packet filtering unit 140 may comprise a state machine coupled to the lookup table 150 and/or the system memory 120. One or more sequences of program instruction sets residing in the system memory 120 and executable by the processing unit 102 may operate in conjunction with and/or support operations performed by the packet filtering unit 140. In an exemplary embodiment, the state machine may be implemented using a Field Programmable Gate Array (FPGA).

The packet-filtering unit 140, in conjunction with the lookup table 150, may perform two filtering operations. The first filtering operation performs header filtering of each data packet received which is described in detail below. The second filtering operation performs string filtering of the payload of each data packet received. Various string filtering operations of payloads are well known to those in the art and will not be described further herein.

An IDS constructed or implemented in accordance with the present invention may operate in a variety of network environments. For example, an IDS capable of performing header or packet filtering operations in a manner disclosed herein may monitor network traffic 1) within a LAN; 2) between a LAN and an external network such as the Internet, where the IDS may form a portion of a firewall system; or 3) between subnetworks within a system of networks.

There are several standard and well known protocols for data packet transmission a computer network. Examples include Internet Control Message Protocol (ICMP), User Datagram Protocol (UDP), and Transmission Control Protocol (TCP). These examples differ in the manner in which group identifiers may be combined to form ICMP, UDP, and TCP header signatures. Header signatures are compared to a list of known header signatures in the lookup table 150 to determine if a specific header signature is known to be from a malicious source. Each header signature, regardless of the protocol from which it was created spans 21 bits, and thus the lookup table 150 requires 2,097,152 ($2^{21}$) entries.

Figure 2:
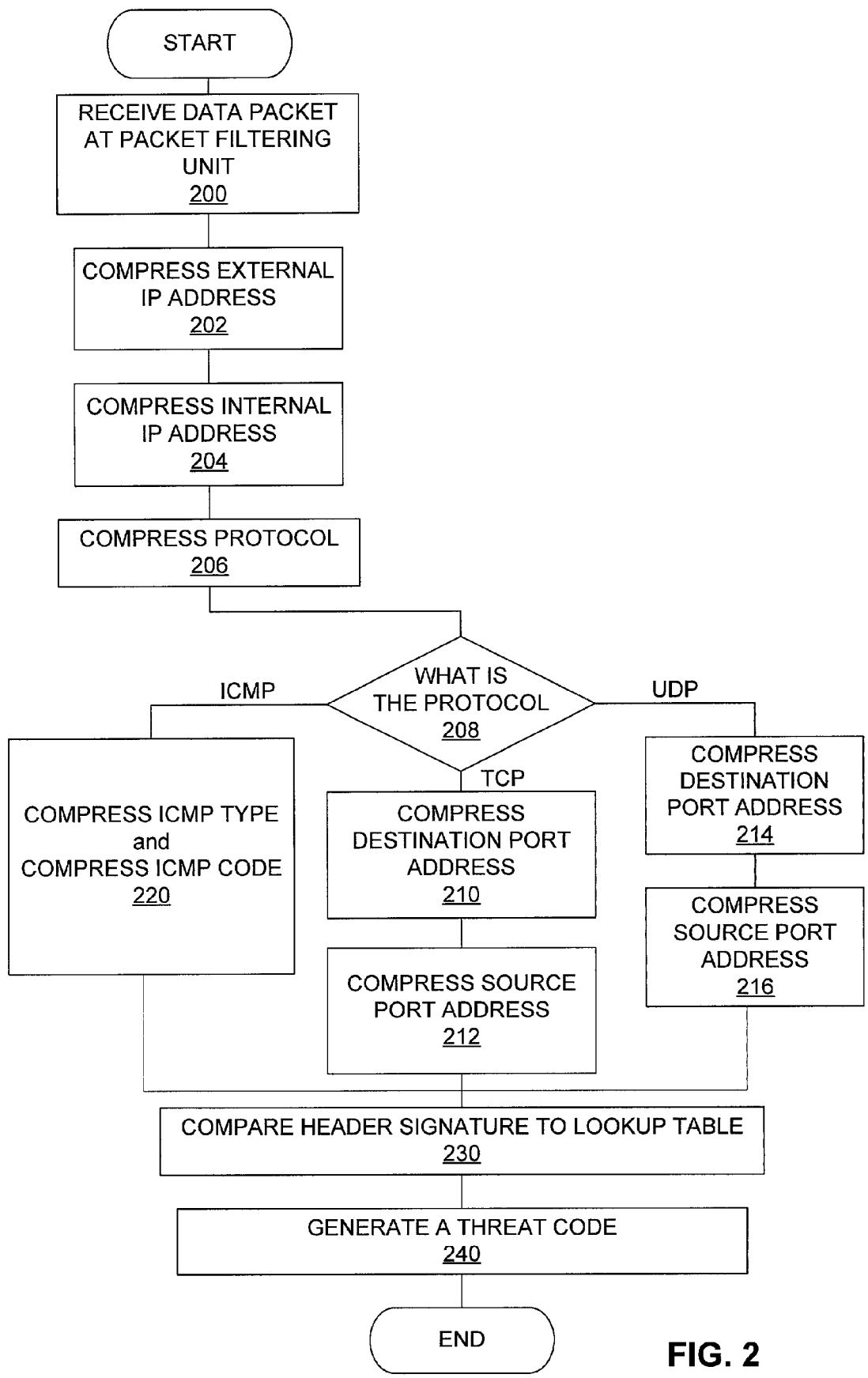
FIG. 2 is a flowchart of a method for performing header filtering operations in accordance with an embodiment of the invention.

FIG. 2 is a flowchart of a method for performing header and/or packet filtering operations in accordance with an embodiment of the invention. The method may be performed via hardware and/or software. In one embodiment, the method may be performed and/or directed by a packet filtering unit 140 within a system 100 such as that shown in FIG. 1.

All data packets contain headers that have a plurality of groupings of data bits to indicate data-packet parameters such as, for example, source, destination, protocol, etc. of the data packet. The described method compresses, the header into a header signature. A header signature comprises a compressed representation of the data bits within a received data packet header. Typically, the header signature comprises a set of header-field groups appropriately generated in accordance with protocol type, as detailed below. The compression of data bits in field groups is known as multidimensional data compression. Multidimensional data compression will be described below after a general description of the overall method for generating a header signature.

A method for generating a header signature begins at step 200 where the packet-filtering unit 140 receives the entire header of a particular data packet.

Next, at step 202, the packet-filtering unit 140 retrieves a destination Internet Protocol (IP) address as specified within the data-packet header which is typically 32 bits in length. Once retrieved, the destination IP address is compressed into a first header-field group which is typically 3 bits in length. In one embodiment, compression of the destination IP address into the first header-field group comprises a memory lookup operation using the lookup table 150.

Next, at step 204, the packet-filtering unit 140 retrieves a source Internet Protocol (IP) address as specified within the data-packet header which is also typically 32 bits in length. Once retrieved, the source IP address is compressed into a second header field group which is typically also 3 bits in length, in a manner analogous to step 202. Compression of the source IP address into the second header-field group may also comprise a memory lookup operation using the lookup table 150.

Next, at step 206, the packet filtering unit 140 retrieves a transport protocol as specified within a data packet header which is typically 8-bits in length. Once retrieved, the transport protocol is compressed into a third header-field—field group which is typically 2 bits in length. Similarly, compression of the transport protocol into the third header-field group may also comprise a memory lookup operation such as that of the lookup table 150.

At step 208, a determination is made as to which particular protocol the data packet is using. In this embodiment, there are three possible protocol choices: ICMP, UDP, and TCP. Depending on which protocol is present, additional header-field groups may also be generated in the header signature by implementing a memory lookup operation using the lookup table 150.

In the event that the protocol corresponds to TCP, the method moves to step 210 where a destination port address is retrieved and compressed into a fourth header-field group. Typically, the destination port address is 16 bits in length and compressed into 6 bits. Next, if the protocol is determined to be TCP, the method moves to step 212 where a source port address is retrieved and compressed into a fifth header-field group. Typically, the source port address is 16 bits in length and compressed into 7 bits. The method then moves to step 230 (described below) as the header signature has been assembled with five header-field groups for TCP.

In the event that the protocol corresponds to UDP, the method moves to step 214 and 216. These steps are analogous to steps 210 and 212 for TCP protocol and generate a fourth and fifth header-group field as described above. Again, once the header signature for UDP has been assembled with five header-field groups the method then moves to step 230

In the event that the protocol corresponds to ICMP, the method moves to step 220. At step 220, a fourth header-field group may be generated by using the lookup table 150. Two related sets of data bits are used to generate the fourth header-field group for ICMP. First, a set of bits corresponding to an ICMP type (typically 8-bits) is compressed into typically 3-bits. Second, a set of bits corresponding to an ICMP code (also typically 8-bits), is compressed into typically 3-bits. The method then moves to step 230 (described below) as the header signature has been assembled with four header-field groups for ICMP.

At step 230, the newly created header signature is compared to known header signatures in the lookup table 150. As was previously stated, the header signature comprises a compressed representation of information within a received data packet, and may comprise a set of header-field groups appropriately generated in accordance with protocol type, as detailed in steps 202 through 220. Following any of steps 212, 216, or 220, the header signature for a particular data packet has been completely assembled and a memory lookup operation is performed at step 230. At step 240, the lookup operation will return a threat code according to whether a match was determined in the lookup table 150.

A threat code may comprise 1 byte and is an indication of whether no match has been determined, a match which requires further analysis has been determined, or a match which indicates a known header signature has been determined. Each threat code determines an outcome associated with or corresponding to a data packet. For example, if no match is found, the data packet is passed along to the system 100 from the network interface unit 130. In direct contrast, if there is a definitive match, the data packet is captured and not allowed to pass to the system 100. However, there may be many instances in which the method described above performed by the header filtering unit 140 alone may not determine a final outcome. For these cases, a signature group identifier may be returned as part of the threat code, which summarizes the results of the performed filtering method. Signature group identifiers may be similar to field group identifiers in that they are designed to retain all information necessary to support the header filter's contribution to a final outcome. The signature group identifier may be provided to a separate process (not described herein) that determines a final outcome.

Multidimensional data comprises multiple data elements that convey multiple types of information. Complex relationships between the data elements or portions thereof may exist. During multidimensional data processing operations, such relationships may require analysis to arrive at an outcome or result. In many situations, the number of possible outcomes may be quite limited, perhaps to a few or several choices.

As described above in one embodiment, multidimensional data is used to generate a corresponding header signature. The signature conveys all information necessary to determine the contribution that each data element within the uncompressed multidimensional data makes to a final outcome or result.

For example, a data element may have 65,536 possible values, but its final contribution may be to determine one of four possible outcomes. Each of the 65,536 possible values can be mapped into one of four possible groups, where the group determines one of the four possible outcomes. For example, in data processing terms, a 16-bit value can be represented by a 2-bit value, giving a compression ratio of 8:1.

Each data element within a multidimensional data set can be compressed in an analogous manner. The compression of each data element may be determined by a number of possible outcomes that it affects. The data can then be represented by a collection of groups that comprise the signature, which conveys all information necessary to determine a final outcome. Processing operations directed toward determining interrelationships between groups can be replaced with a simple lookup table operation, where the signature may be used as an index into the lookup table, and each table entry defines a final outcome. Complex relationships between data types may be defined in the programming of the lookup table.

The following example illustrates how two data types may be compressed in accordance with an embodiment of the present invention such that a single signature may correspond to six conditions resulting in one of four possible outcomes.

Data Elements:
- a. size: 0, 1, 2, . . . , 255
- b. color: blue, brown, yellow, red, green, orange, black, white, purple, i. salmon Conditions:
- c. Condition1: If size=3 .AND. color=green, then Outcome1
- d. Condition2: If size=7 .AND. color=(yellow .OR. black), then Outcome2
- e. Condition3: If size!=100 .AND. color=blue, then Outcome3
- f. Condition4: If size=(255 .OR. 34) .AND. color=black, then Outcome1
- g. Condition5: If size=100 .OR. color=red, then Outcome2
- h. Condition6: If none of the above, then Outcome4

Each outcome in this example is the result of 5 unique sizes and 5 unique colors. The two data types may be grouped as follows:

Size Grouping:
  3 belongs to Size Group 1 (S1)
  7 belongs to Size Group 2 (S2)
  255 belongs to Size Group 3 (S3)
  34 belongs to Size Group 4 (S4)
  100 belongs to Size Group 5 (S5)
  All other sizes belong to Size Group 6 (S6)

Color Grouping:
  green belongs to Color Group 1 (C1)
  yellow belongs to Color Group 2 (C2)
  black belongs to Color Group 3 (C3)
  blue belongs to Color Group 4 (C4)
  red belongs to Color Group 5 (C5)
  All other colors belong to Color Group 6 (C6)

Raw data in the form (size, color) may now be replaced by a compressed signature (S, C), where S and C are the group identifiers for the size and color data elements, respectively. The size group identifier has 6 possible values, and may therefore be represented by a 3-bit binary value. The color group identifier also has 6 possible values, and may therefore be represented by a 3-bit binary value. These two 3-bit values may be concatenated to form a 6-bit signature, with the size group identifier being the 3 most significant bits. The group identifier value assignments may be defined as follows:

| | | |
|---|---|---|
| a. | S1 == 0 | C1 == 0 |
| b. | S2 == 1 | C2 == 1 |
| c. | S3 == 2 | C3 == 2 |
| d. | S4 == 3 | C4 == 3 |
| e. | S5 == 4 | C5 == 4 |
| f. | S6 == 5 | C6 == 5 |
| g. | not used == 6 | not used == 6 |
| h. | not used == 7 | not used == 7 |

A data set (100, black) may be replaced with the signature (4, 2) that has the 6-bit binary representation 100010. A lookup table may be used to determine which condition a data set matches and what the outcome should be. The table may have as many entries as there are possible combinations of size and color groups. The signature in this example spans 6-bits, representing 64 possible combinations. Therefore, the lookup table includes 64 entries. The index into the lookup table comprises the signature value. Each entry in the table may be programmed with the outcome that corresponds to the group combination defined by the associated signature.

It may be the case that more than one signature represents a single filter condition. This may occur when "don't cares" or the Boolean operator "OR" appear in the filter condition. The filter condition outcome may be programmed into every table entry where the outcome signature satisfies the condition. For example, a filter condition that specifies only a color and no size has eight possible size values that can appear with the color that satisfy the condition. The condition's outcome may be programmed into all eight entries associated with the specified color.

FIG. 3 represents a lookup table 150 corresponding to the above example, addressed in accordance with signature values and storing associated processing outcomes corresponding to size and color data elements. The lookup table 150 is presented in the format "binary signature 300: outcome/condition 302". The condition number would not necessarily be entered into the lookup table 150, but is shown to clarify which condition caused the outcome.

The raw data format in the example corresponding to FIG. 3 may be represented by a 12-bit uncompressed signature value, i.e., 8 bits to identify the size and 4 bits to identify the color. Such an uncompressed signature would require a lookup table 150 with 4,096 entries. This is a modest size that can be realized without compression. However, there are many applications in which a lookup table 150 would be so large that implementation without compression would not be feasible.

I claim:

1. A computer-based method for performing header filtering of data, the method comprising:
   (a) separately compressing each of a plurality of different fields of the header of a data packet and combining compressed representations of each of the plurality of different fields of the header to obtain a header signature;
   (b) determining if the header signature matches a known header signature; and
   (c) if the header signature is determined to have a match, then identifying the header signature as a known header signature.

2. The method of claim 1 wherein the header comprises the plurality of fields corresponding to parameters of the data packet.

3. The method of claim 2 wherein the compressed representations of each of the plurality of different fields of the header comprise a plurality of header-field groups that correspond to the plurality of fields.

4. The method of claim 3 wherein the header is compressed using a compression algorithm that comprises:
   (a) obtaining the data bits contained in each field;
   (b) determining the header-field group that corresponds uniquely to each field, wherein determining the header-field group comprises using a lookup table;
   (c) representing each field with a header-field group of the corresponding predetermined combination; and
   (d) concatenating each header-field group to create the header signature.

5. The method of claim 1 further comprising storing known header signatures in a lookup table.

6. The method of claim 1 further comprising flagging data packets having header signatures identified as known header signatures to be filtered.

7. A computer-based method for scanning data, the method comprising:
   (a) receiving a stream of data packets, each data packet comprising a header and a payload, each header comprising a plurality of fields;
   (b) determining a header-field group for each of the plurality of fields in each header, wherein determining the header-field group comprises separately compressing each of the plurality of fields to form the respective header-field groups;
   (c) concatenating each header-field group to create a header signature for each header; and
   (d) determining that a header signature is a known header signature if the header signature matches a header signature from a predetermined list of header signatures.

8. The method of claim 7 further comprising flagging known header signatures identified by comparison to the list of header signatures for filtering.

9. The method of claim 7 wherein determining the header-field group comprises:

(a) obtaining the data bits contained in each field
(b) using a lookup table to determine the header-field group that corresponds uniquely to each field; and
(c) representing each field with the corresponding header-field group of the corresponding predetermined combination.

10. A method for identifying the source of data packet, the method comprising:
(a) receiving a data packet at a packet filtering unit, the data packet having a header and a payload;
(b) identifying a plurality of fields in the header of the data packet;
(c) separately determining a header-field group for each field in the header by reading the data bits in each field and separately cross-referencing the data bits for each field in a first lookup table of header-field groups;
(d) concatenating the header-field groups to yield a header signature;
(e) determining if the header signature matches any header signature in a list of header signatures; and
(f) identifying the header signature as a known header signature if the header signature matches any header signature in the list of header signatures in a second lookup table.

11. The method of claim 10 further comprising if the header signature is determined to be a known header signature, then flagging the data packet corresponding to the header signature.

12. The method of claim 10 wherein the list of header signatures is stored in a lookup table.

13. The method of claim 10 wherein one of the fields is a destination internet protocol address field.

14. The method of claim 10 wherein one of the fields is a source internet protocol address field.

15. The method of claim 10 wherein one of the fields is a transport protocol address field.

16. The method of claim 10 wherein one of the fields is a destination port address field.

17. The method of claim 10 wherein one of the fields is a source port address field.

18. The method of claim 10 wherein one of the fields is an internet control message protocol type and code field.

19. A system for header filtering of data packets, the system comprising:
(a) a lookup table in a memory operable to store known header signatures; and
(b) a packet-filtering unit connected to a network and coupled to the memory, the packet-filtering unit operable to: (i) separately compress each of a plurality of different fields of the header of a data packet and then combine compressed representations of each of the plurality of different fields of the header to obtain a header signature; (ii) compare the header signature to known header signatures in the lookup table; and (iii) identify the header signature as a known header signature if the header signature is determined to have a match.

20. The system of claim 19 wherein the header is compressed using a compression algorithm and wherein the compressed representations of each of the plurality of different fields of the header comprise a plurality of header-field groups that correspond to the plurality of fields, the compression algorithm comprising:
(a) obtaining the data bits contained in each field;
(b) determining the header-field group that corresponds uniquely to each field, wherein determining the header-field group comprises using the lookup table;
(c) representing each field with a header-field group of the corresponding predetermined combination; and
(d) concatenating each header-field group to create the header signature.

21. A system for identifying the source of data packet, the system comprising:
(a) a lookup table in a memory operable to store known header signatures; and
(b) a packet-filtering unit connected to a network and coupled to the memory, the packet-filtering unit operable to: (i) receive a data packet having a header and a payload; (ii) identify a plurality of fields in the header of the data packet; (iii) separately determine a header-field group for each field in the header by reading the data bits in each field and to separately cross-reference the data bits for each field in the lookup table of header-field groups; (iv) concatenate the header-field groups to yield a header signature (v) determine if the header signature matches any header signature in a list of header signatures; and (vi) if the header signature matches any header signature in the list of header signatures, identify the header signature as a known header signature.

22. The system of claim 21 further comprising a filter for filtering a data packet if the header signature of the data packet is determined to be a known header signature.

* * * * *